(12) United States Patent
Andre

(10) Patent No.: US 6,798,887 B1
(45) Date of Patent: Sep. 28, 2004

(54) KEY CLICK MASKER AND METHOD FOR MASKING KEY CLICKS

(75) Inventor: Robert Floyd Andre, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/344,049

(22) Filed: Jun. 25, 1999

(51) Int. Cl.[7] ............................ H04R 3/02; H03B 29/00
(52) U.S. Cl. .......................... 381/73.1; 381/71; 381/1
(58) Field of Search ......................... 381/73.1, 71.1; 713/200; 714/39; 709/225, 224

(56) References Cited

U.S. PATENT DOCUMENTS

| 4,972,469 A | * | 11/1990 | Saltwick et al. | 380/2 |
| 5,177,785 A | * | 1/1993 | Itani et al. | 380/253 |
| 6,188,771 B1 | * | 2/2001 | Horrall | 381/73.1 |

* cited by examiner

*Primary Examiner*—Forester W. Isen
*Assistant Examiner*—Elizabeth McChesney
(74) *Attorney, Agent, or Firm*—Roy W. Truelson

(57) ABSTRACT

A key click masker and method for disguising key clicks protect sensitive information by randomly varying key click echo generated by a computer system. The key click masker and method disguise the actual keystrokes by generating sounds that would confuse a listener trying to determine the actual keystrokes entered by a user while the user is inputting sensitive information on an input device.

25 Claims, 3 Drawing Sheets

KEY CLICK MASKER AND METHOD FOR MASKING KEY CLICKS

BACKGROUND OF THE INVENTION

1. Technical Field

The present invention generally relates to computer systems, and more particularly to a method and apparatus for disguising key click sounds made during password entry or entry of other sensitive information.

2. Description of the Related Art

A typical computer system has a keyboard input device, a visual display device, a processing unit containing memory and one or more processors, and various other system peripherals to provide input and output for the system. Many systems contain a speaker, either in the processing unit, the keyboard, or the display device, to provide audible feedback for various purposes such as error indications, keystroke echo clicking, and audio for entertainment and other purposes.

Many of today's applications of computers are sensitive to misuse by other persons. Computers in the workplace tie individuals' identities to user codes and passwords. Responsibility for information protected by passwords can be a liability for both employees and companies. In addition, applications of computers today sometimes directly involve money or monetary transactions. These transactions occur in the home as well as workplaces, due to the use of the Internet as a medium for sales and banking transactions.

Present point-of-sale systems follow generally the above description of a computer system, with the addition of a cash drawer and a receipt printer, among other peripherals. Such a system is directly sensitive to misuse, as knowledge of the password can provide access to the cash drawer.

Present systems to protect the integrity of a password on a computer system include devices and methods for visually disguising the password. The password is concealed during entry by replacing the normal display output of the text of the password with a non-revealing character (typically an asterisk), suppressing the display of text totally, generating random characters, or employing other means to visually disguise the password from unauthorized observation.

Unauthorized persons may also gain information from the sound of a password or other sensitive information as it is being typed on a keyboard. The most obvious example of this is the length of a password entry. An unauthorized person may simply count the number of keystrokes heard to learn the number of characters in the password.

Computer keyboards make mechanical noise, and some systems may generate audible key clicks by use of a keyboard echo apparatus or program means for generating key click sounds by speakers or other audio devices connected to the computer. These key click echo generators are typically used to provide feedback to the typist. These sounds can also provide information to an unauthorized user, which it is desirable to protect.

Similarly, Point-Of-Sale machines (POS) and Automated Teller Machines (ATM) require the use of passwords or Personal Identification Numbers (PIN) for access to accounts. These machines might also benefit from enhanced security if the sounds produced by the operation of their keypads were masked by generating sound while the keys are being pressed.

It is possible that sophisticated listening devices could be created that could use the variations present in key position to determine, after some analysis, a mapping of the keyboard sounds to the individual characters.

It would, therefore, be desirable to provide a method and apparatus for disguising the key click sounds of mechanical origin or those generated by a computer system. It would be further advantageous if a key click echo provided by a computer system could be randomized or varied in tone, volume, or spacing in such a way as to disguise the actual characters and number of characters which were typed by a user entering a password or other sensitive information.

The inventors are aware of no other invention that performs the desired function, and therefore have provided a novel use for novel methods and apparatus claimed herein.

SUMMARY OF THE INVENTION

It is therefore one object of the present invention to provide a method for disguising sounds created by operation of an input device during the input of sensitive information.

It is therefore another object of the present invention to provide a method for disguising key click sounds created by operation of a computer during the input of sensitive information.

It is another object of the present invention to provide a method for disguising key click sounds created by operation of a computer during the input of sensitive information by creating random variations in the key click patterns of a key click echo generator.

It is another object of the present invention to provide a masker capable of disguising input device sounds.

It is still another object of the present invention to provide a key click masker capable of disguising key click sounds.

It is yet another object of the present invention to provide a computer system having control means for causing an audio output device to mask key click sounds.

It is yet another object of the present invention to provide a computer program product for causing a computer system to control its audio output device to mask key click sounds.

The foregoing objects are achieved in a key click masker and method for masking key clicks. They also may be embodied in a computer system, or practiced on a general purpose computer by the execution of a program provided as a computer program product. The key click masker generally comprises a control means which may be embodied in a general purpose computer, a keypad or keyboard connected to the computer, and an audio generator, which may be a sound generator within the computer comprising a speaker and driver electronics. Said method may be embodied in a computer program, which may be embedded in the BIOS (Basic Input/Output System) of a general purpose computer, or may be provided as a device driver, other operating system program, or in an application program.

The above, as well as additional objectives, features, and advantages of the present invention, will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION

Figure 3:
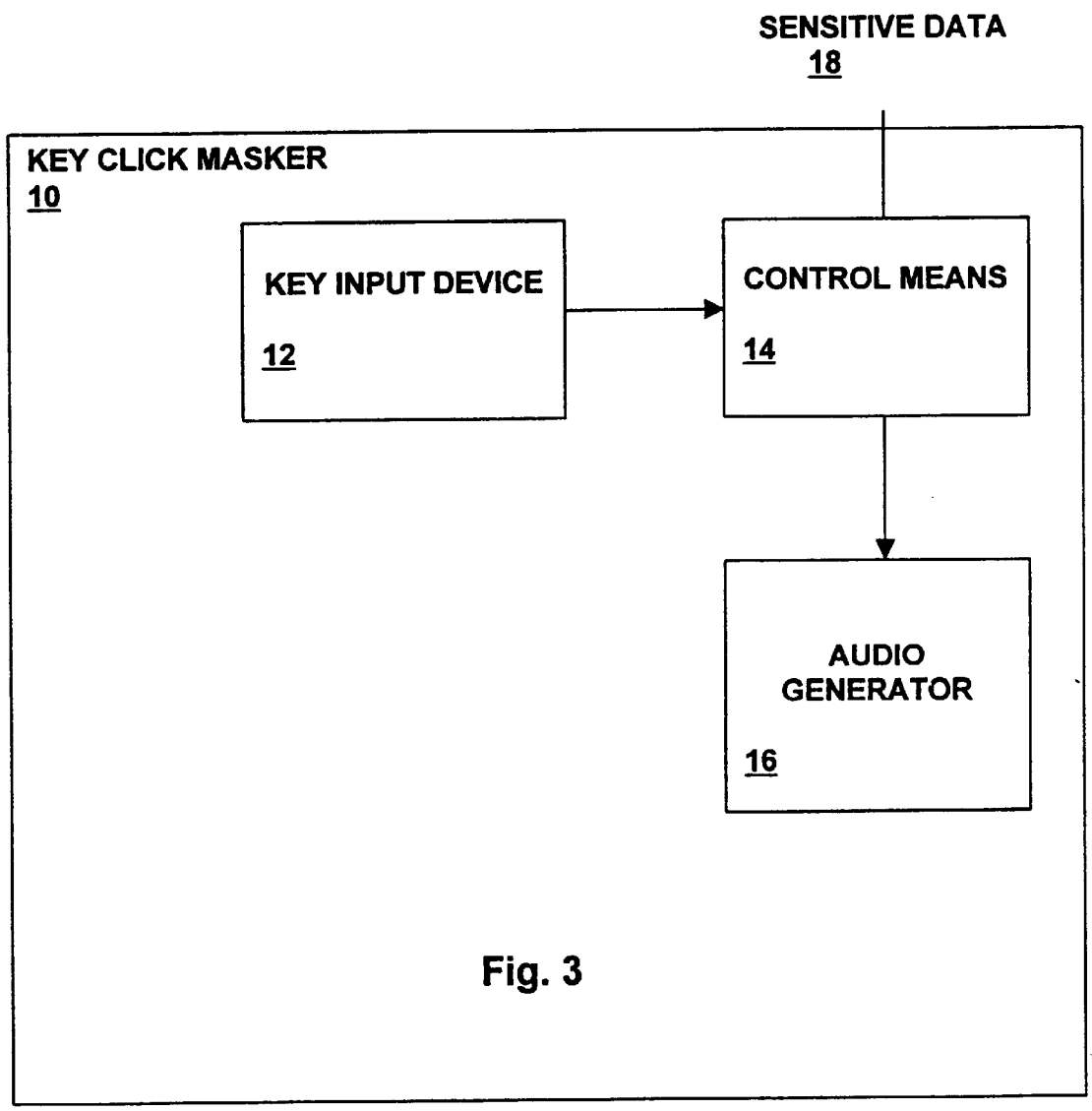
FIG. 3 is a electrical block diagram of the key click masker constructed in accordance with one embodiment of the present invention.

With reference now to the figures, and in particular with reference to FIG. 3, there is depicted one embodiment of a KEY CLICK MASKER 10 constructed in accordance with one embodiment of the present invention. KEY CLICK MASKER 10 is generally comprised of a KEY INPUT DEVICE 12, a CONTROL MEANS 14, and an AUDIO GENERATOR 16.

The CONTROL MEANS 14 receives an indication when a user is inputting sensitive information. This may be accomplished by means of a special code from the KEY INPUT DEVICE 12, a SENSITIVE DATA 18 input, or, in the case of a CONTROL MEANS 14 embodied within a general purpose computer, this detection can occur as a result of program instructions within the computer.

When the SENSITIVE DATA 18 input is active, the CONTROL MEANS 14 causes the AUDIO GENERATOR 16 to generate sounds which will deceive listeners or listening devices that are trying to determine which or how many keys have been pressed. This can be accomplished by varying the volume, tone, spacing (including initial delay), duration, or combinations of any of these variations of a key click sound that may be provided by a key click echo in a computer system. But, it is not necessary that a key click echo be generated for the entry of ordinary data in order to practice the present invention. It is further not necessary that the sound that is generated resemble the current audio feedback tones that are used to simulate key clicks for typists. The key click masker may generate audio only during the input of sensitive information, and it might only mask the actual mechanical sounds produced by the operation of the computer keyboard. Any sound generation that is sufficient to mask the sound of the mechanical keyboard or keypad is contemplated by the present invention. The masking sounds produced preferably do not correspond to the key pressed on the KEY INPUT DEVICE 12. By having a characteristic that does not correspond to the key sounds, an effect of making the sounds difficult to discern can be obtained. It is also possible to confuse an unwanted listener by allowing sounds to be discernable, but by producing sounds which do not correspond to the actual keys pressed on the KEY INPUT DEVICE 12.

According to embodiments of the present invention, it is desirable to generate masking sounds which vary either the tone, spacing (which is the length of time between sounds), volume, duration or by any combination of these techniques. The variation can be generated randomly, it can be generated as a simple sequence, by some algorithm, by table lookup, or by any combination of these techniques. For example, the masking sounds could be simply key click echoes which become shorter as a function of the position of the keystroke within a password. This could have the effect of allowing the user partial feed back while making it difficult for a listener to memorize a pattern of clicks. Yet another example is a touch pad where the pitch of an echo tone is tied to the particular key that is pressed. During entry of secure codes, the tone output could be randomly chosen, so as to provide improper feedback during that interval, but to protect the data being entered. A final example would just generate random sounds varying in spacing and duration during the entry of secure data, resembling the noise produced by the mechanical keys, to reduce the possibility that a listening device could provide data that could be repetitively analyzed. This data could produce the eventual ability to directly decode keystrokes from the sound produced by the switches.

Figure 1:
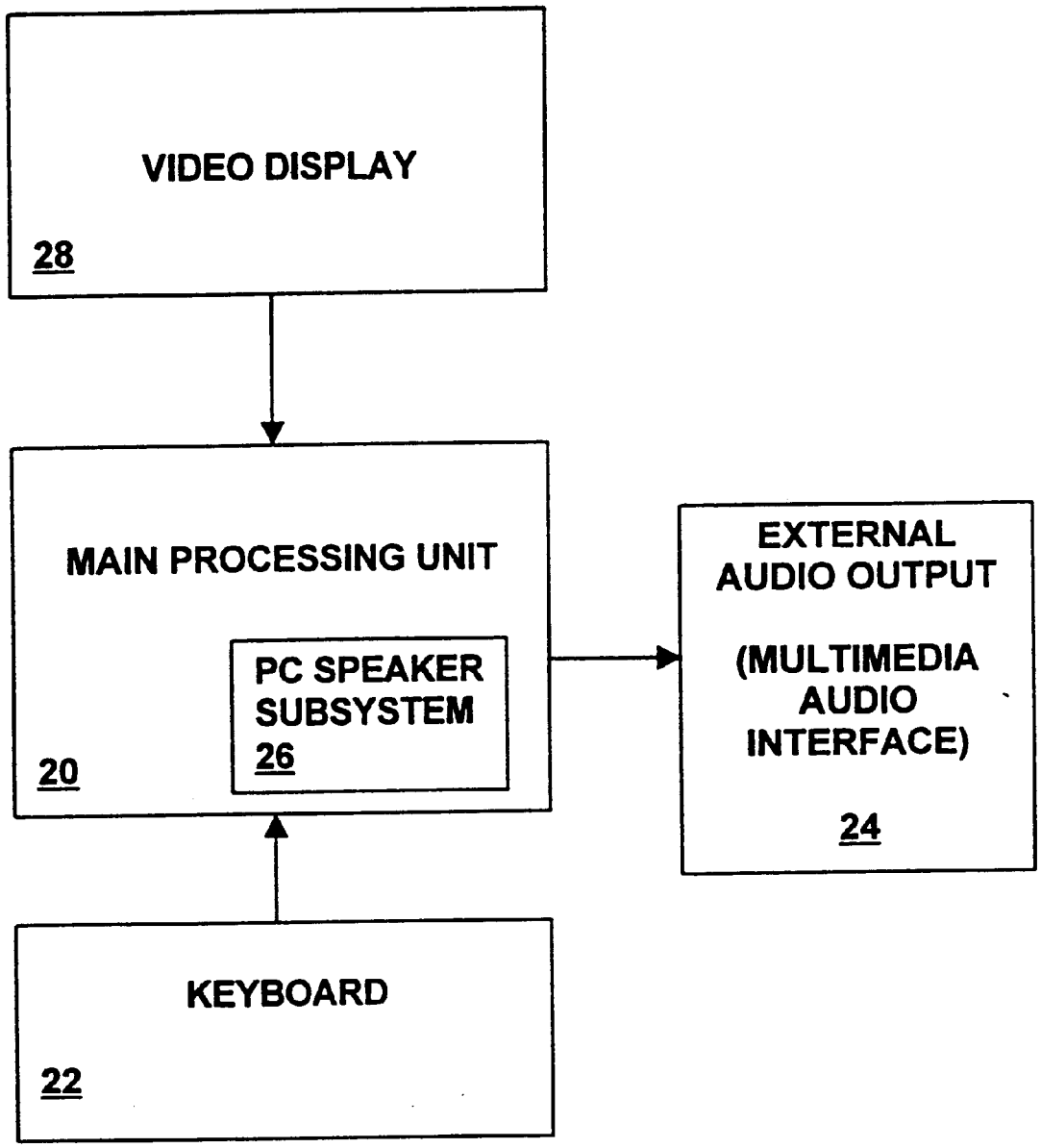
FIG. 1 is a block diagram of a computer system showing a keyboard, video display, main processing unit, and outboard audio components, in which the present invention may be implemented.

Referring now to FIG. 1, where an embodiment of the key click maker within a general purpose computer system is shown. The computer system typically comprises a VIDEO DISPLAY 28, a MAIN PROCESSING UNIT 20 optionally containing a PC SPEAKER SUBSYSTEM 26, an optional EXTERNAL AUDIO OUTPUT 24, and a KEYBOARD 22. The MAIN PROCESSING UNIT 20, contains means for processing input commands that are input by the KEYBOARD 22. The VIDEO DISPLAY 28, which is typically an LCD or CRT display on a conventional computer system, provides user feedback and prompting for user input. The masking sounds generated by this system can be output from either or both of the PC SPEAKER SUBSYSTEM 26 or the EXTERNAL AUDIO OUTPUT 24. In some systems, the EXTERNAL AUDIO OUTPUT 24 or PC SPEAKER SUBSYSTEM 26 may be integral to the VIDEO DISPLAY 28 or KEYBOARD 22. This is a packaging, not a functional consideration, and the specific configuration is not limited in the present invention. The PC SPEAKER SUBSYSTEM 26, is typically a low quality audio device which resides in the MAIN PROCESSING UNIT 20, and is comprised of a speaker and driver electronics sufficient to produce prompts such as self-test tone indications during startup of the computer and simple user feedback such as the key click echoes provided on some computer systems.

The optional EXTERNAL AUDIO OUTPUT 24, may be a device to create higher quality audio output, such as the multimedia audio devices supplied with present-day personal and business computers. The EXTERNAL AUDIO OUTPUT 24 usually comprises an integral sound device and driver, either within the computer or attached by means of a sound expansion card, or it may be totally or partially embedded in the VIDEO DISPLAY 28 or KEYBOARD 22.

The program state of the computer system is controlled such that when the user is being prompted for the input of sensitive data, the PC SPEAKER SUBSYSTEM 26, EXTERNAL AUDIO OUTPUT 24, or both are caused to produce masking sounds while the user is entering the sensitive data on the KEYBOARD 22. This control of the program state may be provided by a device driver or subsystem within the operating system program of the computer, but can be alternatively provided by a computer program product containing an application or device driver that can be installed on computer systems currently available. Upon activation by an application seeking secure keyboard input, the driver would then activate the EXTERNAL AUDIO OUTPUT 24 to produce the masking tones when a key is pressed on the KEYBOARD 22.

Figure 2:
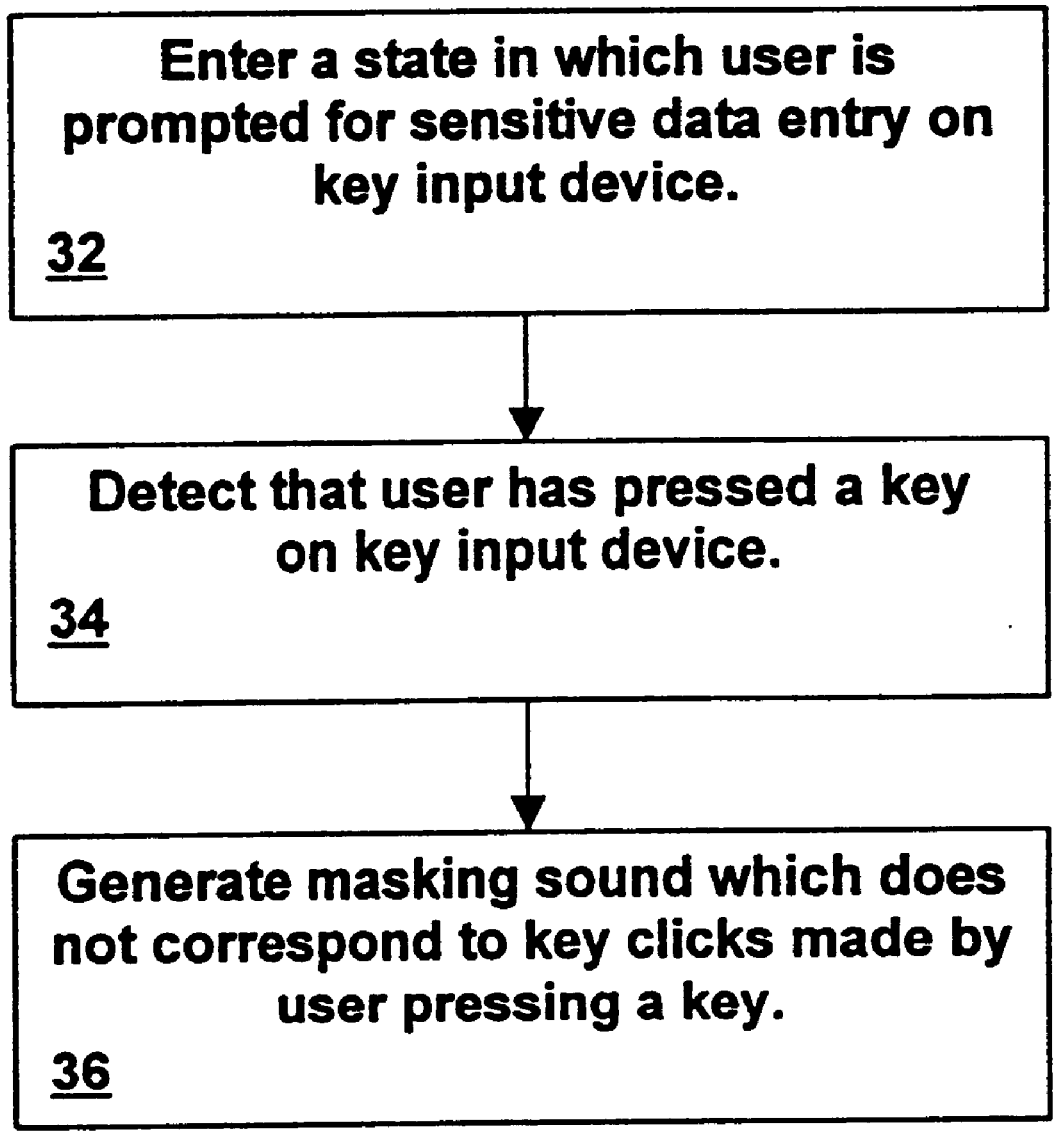
FIG. 2 is a flow diagram of one method for masking key clicks in accordance with the present invention.

Referring now to FIG. 2, the method for masking key clicks is shown in a flow diagram. When a state is entered in which the user is being prompted for input of sensitive data (32), the key click masker detects when a user has pressed a key on the key input device (34), and then generates masking sounds which do not correspond to the key clicks made by the pressing of the keys (36). This method differs from the implementation of a key click echo in that key click echoes do correspond to the pressing of a key and therefore are intended to make the keyboard action more audible.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, the invention may be used to mask sounds produced by a mouse or joystick. It is therefore contemplated that such modifications can be made without departing from the spirit or scope of the present invention as defined in the appended claims.

What is claimed is:

1. A method for inputting sensitive data to a digital data device, comprising:

Entering a state in which a user is prompted for entry of sensitive information on an input device for inputting data to a digital data device, said input device generating electronic digital data corresponding to a user input, said input device further generating incidental sounds separate from said electronic digital data when a user inputs data using said input device;

automatically detecting that a user using said input device has entered said state in which the user is prompted for entry of sensitive information on said input device; and responsive to said step of automatically detecting that said user has entered said state, automatically generating masking sounds which do not correspond to said incidental sounds made by said input device while said sensitive information is being entered, said masking sounds masking said incidental sounds.

2. The method of claim 1 further comprising the step of varying the volume of said masking sounds.

3. The method of claim 1 further comprising the step of varying the tone of said masking sounds.

4. The method of claim 1 further comprising the step of varying the spacing of said masking sounds.

5. The method of claim 1 further comprising the step of varying the duration of said masking sounds.

6. The method of claim 1 wherein said input device comprises a keyboard.

7. A computer system comprising:

means for processing a series of input commands;

an input device coupled to said computer system for allowing user input of said input commands, said input device generating electronic digital data corresponding to user input, said input device further generating incidental sounds separate from said electronic digital data when a user inputs data using said input device;

an audio generator coupled to said computer system for producing audible sounds; and control means for causing said audio generator to generate masking sounds which do not correspond to said incidental sounds made by said input device during user input of sensitive information, said masking sound masking said incidental sounds.

8. The computer system of claim 7 wherein said computer system comprises a point-of-sale terminal.

9. The computer system of claim 7 wherein said computer system comprises an automated teller machine.

10. The computer system of claim 7 wherein said input device comprises a keyboard.

11. The computer system of claim 7 wherein said control means causes said masking sounds to vary in volume.

12. The computer system of claim 7 wherein said control means causes said masking sounds to vary in tone.

13. The computer system of claim 7 wherein said control means causes said masking sounds to vary in spacing.

14. The computer system of claim 7 wherein said control means causes said masking sounds to vary in duration.

15. A device for inputting sensitive data, comprising:

an input device for entry of information by a user to a digital data device, said input device generating electronic digital data corresponding to a user input, said input device further generating incidental sounds separate from said electronic digital data when a user enters information using said input device;

an audio generator for optionally generating echo sounds corresponding to said incidental sounds made by said input device; and control means coupled to said input device and further coupled to said audio generator for causing said audio generator to generate masking sounds which do not correspond to at least one key activated on said input device during user entry of sensitive information.

16. A masker according to claim 15 wherein said input device comprises a keyboard.

17. A masker according to claim 15 wherein said control means causes the audio generator to vary the volume of said masking sounds.

18. A masker according to claim 15 wherein said control means causes the audio generator to vary the tone of said masking sounds.

19. A masker according to claim 15 wherein said control means causes the audio generator to vary the spacing of said masking sounds.

20. A masker according to claim 15 wherein said control means causes the audio generator to vary the duration of said masking sounds.

21. A computer program product comprising:

a computer-readable storage medium; and program instructions stored on said storage medium for:

(a) detecting that a user is inputting sensitive information on an input device, said input device generating electronic digital data corresponding to a user input, said input device further generating incidental sounds separate from said electronic digital data when a user inputs data using said input device; and (b) responsive to detecting that a user is inputting sensitive information on said input device, generating masking sounds during user input of said sensitive information, said masking sounds not corresponding to said user input and masking said incidental sounds.

22. The computer program product of claim 21 wherein said masking sounds vary in volume.

23. The computer program product of claim 21 wherein said masking sounds vary in tone.

24. The computer program product of claim 21 wherein said masking sounds vary in spacing.

25. The computer program product of claim 21 wherein said masking sounds vary in duration.

* * * * *